March 30, 1954 M. H. HUTT 2,673,740

TAPE MARKER FOR MAGNETIC TAPE RECORDERS

Filed Oct. 31, 1950

INVENTOR
MILTON H. HUTT
BY
ATTORNEY

Patented Mar. 30, 1954 2,673,740

UNITED STATES PATENT OFFICE 2,673,740

TAPE MARKER FOR MAGNETIC TAPE RECORDERS

Milton H. Hutt, Moorestown, N. J., assignor to Radio Corporation of America, a corporation of Delaware Application October 31, 1950, Serial No. 193,200

10 Claims. (Cl. 274—11)

Figures 1, 2, 3, 4, 5, 6:
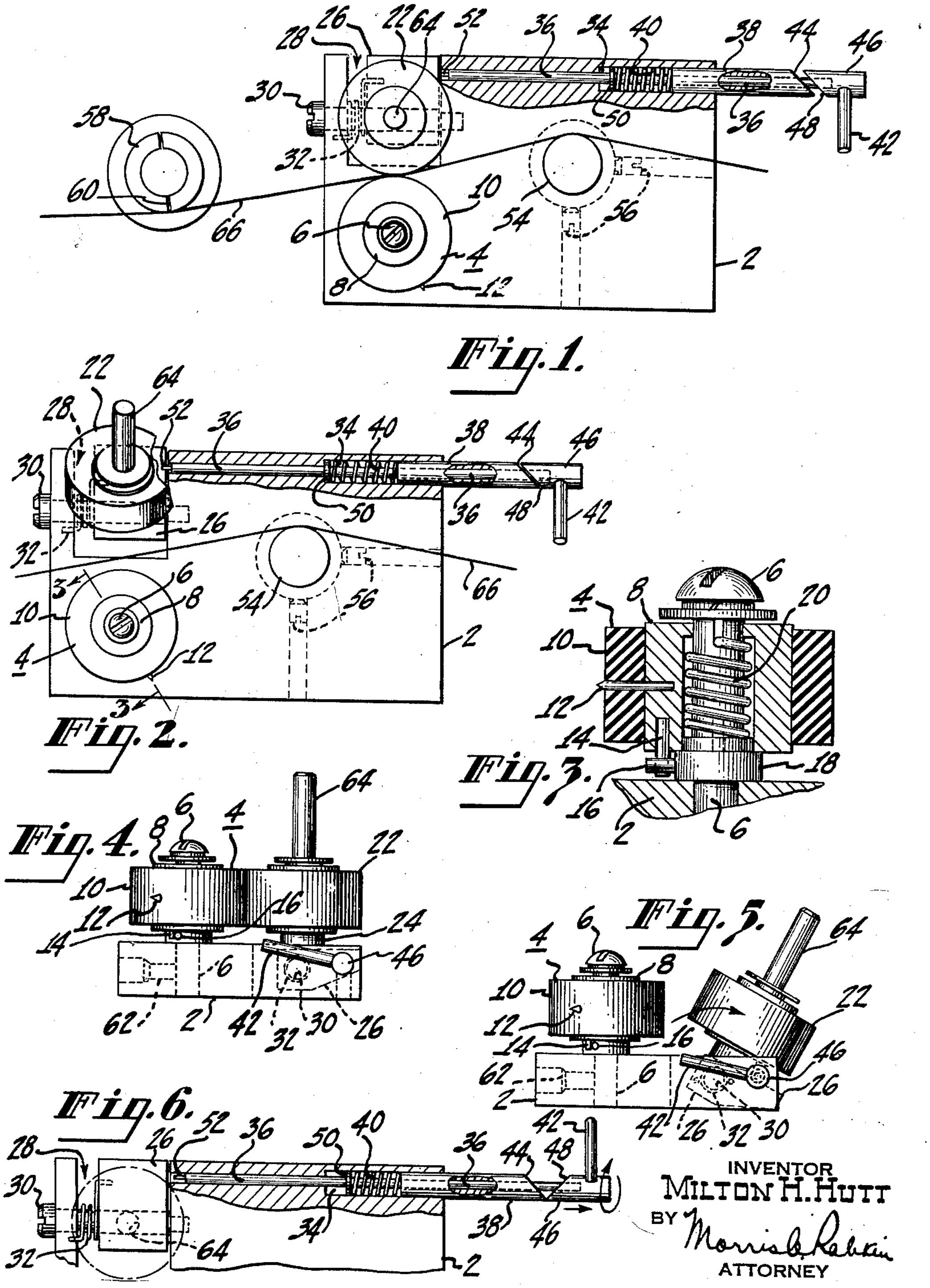

This invention relates to the art of magnetic tape recording, and more particularly to marking devices used in editing magnetic tape records.

Magnetic recording on flexible tape record members has found extensive use in the field of radio broadcasting. A number of broadcasting studios have adopted the practice of recording certain programs on magnetic tape in advance of the time of the actual broadcast. This practice permits a producer or program director to edit the program before it "goes on the air" much in the same manner as motion picture films are edited before they are released to the public. However, in the case of motion pictures, both the picture portion and the sound track portion of the film have visible records which may be edited by eye. On the other hand, there is no visible indication of the signals impressed on a magnetic record tape. Furthermore, no reaction is produced in the transducers used for translating the magnetic impression on the tape into corresponding electrical current unless there is relative motion between the transducer and the tape. Thus, considerable difficulty is encountered in editing magnetic tape records which is not present in the editing of photographic film records. One of the primary difficulties arises in attempting to find the exact spot at which the tape should be cut and, having found the spot, marking it.

It is therefore an object of the present invention to provide improved means for facilitating the editing of tape records upon which there is no visible indication of the record thereon.

Another object of the present invention is the provision of an improved device for marking a tape record at the point where cutting is desired.

A further object of the present invention is to provide a device as set forth above which is characterized by simplicity of construction and operation.

In accomplishing these and other objects, there has been provided a pair of rollers normally in contact with each other operatively attached to a base member. One of the rollers is mounted on a pivoted rocker whereby said roller may be moved to a position out of contact with the other of the rollers. A latch mechanism is provided to hold the pivoted roller, against the force of a biasing spring, in the open position. The fixed axis, or non-pivoted, roller has a marking pin imbedded in the surface thereof. When a length of tape is placed between the two rollers and the pivoted roller is allowed to assume its normal position, pulling the tape through a partial rotation of the rollers causes the marking pin to prick the tape at a desired point. The device is so positioned on the machine that the distance between the gap in the reproducing transducer and the line of contact between the two rollers is the same as the circumferential distance around the marking roller from the rest position of the marking pin to the line of contact between the two rollers.

A better understanding of the present invention may be had from the following detailed description when read in connection with the accompanying drawing wherein, Figure 1 is a top view, partly schematic and partly in section, showing a device constructed in accordance with the present invention and its position relative to other parts of the machine, Figure 2 is a view similar to that of Figure 1 but showing the pivoted roller in its open position, Figure 3 is an enlarged view, partly in cross-section, taken along the line 3—3 of Figure 2 and looking in the direction of the appended arrows, showing some of the details of the marking roller, Figures 4 and 5 are end views of the device showing the pivoted roller in its open and closed positions, respectively, and Figure 6 is a partial top view, partly in section, illustrating the operation of the latch mechanism.

Referring more particularly to the drawing, in Figures 1 and 2 there is shown a base member 2. A marking roller 4 is carried on a shaft 6 secured near one end of the base member. The marking roller, as shown more clearly in Figure 3, comprises a hollow metal core 8 on which is carried a resilient tire 10 made of rubber or the like. A marking pin 12 is secured to and extends radially from a side of the core 8 of the roller 4. The pin 12 extends through and slightly beyond the outer surface of the tire 10. The rotational movement of the marker roller is limited by the cooperative action of a stop-pin 14 secured to the roller core 8 and a limit pin 16 secured to a collar 18 which is, in turn, keyed to the shaft 6. The marker roller 4 is normally held in a rest position (described more fully hereinafter) by a torsion spring 20 carried about the shaft 6 and inside the roller core 8.

A second or pinch roller 22, made of resilient material, such as rubber, is carried on a pivoted shaft 24 (see Figure 4) secured to a rocker block 26. The rocker block is mounted in a recess 28 in the base member 2 and is carried on a pivot shaft 30. The locations of the pinch roller 22, the rocker block 26 and the recess 28 are such that, when the pinch roller is in its closed position, the axes of the first and second rollers are parallel, and the two rollers are in physical contact with each other. The pinch roller is normally biased to its closed position by a rocker block spring 32. However, the roller may be held in a cocked or open position, against the force of the spring 32, by a latch or trigger assembly mounted in a hole 34 adjacent to one edge of the base member 2. This trigger assembly comprises a rod 36 slidably and rotatably carried by the base 2, a sleeve 38 fixedly held within the hole 34 and extending beyond the base 2, a trigger spring 40 around the rod 36 within the hole 34, and a trigger 42. The outer end 44 of the sleeve 38 is cut at an angle to the axis of the sleeve. An enlarged portion 46 is provided on the trigger end of the rod 36 and the trigger 42 is secured thereto. The inner end 48 of the enlarged portion 46 is similarly cut at an angle to the axis of the rod. Thus, a rotational movement of the rod will cause the rod to be retracted against the force of the trigger spring 40 which bears against a washer 50 secured to the rod 36. The end of the rod opposite from the trigger 42 constitutes a sear 52 which is adapted to snap over the upper side of the rocker block 26 when the pinch roller is tilted to its open position, holding the pinch roller in the cocked position.

The device may be used as an attachment for a reproducing machine, in which case a hole 54 is provided in the base member 2 whereby the device may be positioned about the tape driving capstan of the machine, the capstan extending through the hole. The hole 54 is counter-bored from the bottom of the base member to accommodate the capstan bearing. A pair of set screws 56 permit the device to be rigidly secured to the capstan bearing. By securing the device to the bearing in this manner, the two rollers 4 and 22 may be accurately oriented with respect to the reproducing transducer 58 of the machine. This is an important feature, as will be explained hereinafter.

In operation, the device is positioned a fixed distance from the reproducing transducer 58. The rest position of the marking roller 4 is adjusted so that the distance from the gap 60 of the transducer to the point of contact between the two rollers is the same as the circumferential distance around the marking roller from point of contact between the two rollers to the rest position of the marking pin 12. The point of contact between the two rollers, as used herein and in the appended claims, means—the point of intersection of the line of centers of the two rollers with the common tangent passing between the two rollers when the pinch roller is closed. The rest position of the marker roller is determined by the position of the limit pin 16 against which the stop pin 14 is held by the torsion spring 20. As previously set forth, the limit pin is secured to the collar 18 which is, in turn, keyed to the shaft 6 upon which the marking roller is mounted. The shaft 6 is held in the base member by a set screw 62, which may be loosened to allow the aforementioned adjustment of the rest position of the marker roller. After the adjustment has been accomplished, the device is cocked by tilting the pinch roller away from the marking roller, an extension of the pivoted shaft 24 above the pinch roller constituting a convenient cocking lever or handle 64. With the marking device cocked, the reproducing machine is run in its normal manner without interference from the device. When an undesirable portion of the record is reproduced, the normal operation of the machine is interrupted and the beginning of the undesirable passage, the exact place for cutting, is found by moving the tape 66 back and forth, by hand, past the transducer. When the exact spot for cutting is directly opposite the gap in the transducer, the trigger 42 of the device is depressed, rotating the rod 36 and causing the sear 52 to be retracted from the block 26. This allows the pinch roller 22 to snap forward to pinch the tape between it and the roller 4. Thus held between the rollers, as shown in Figure 1, movement of the tape to the right will cause rotation of both rollers until the marking pin passes the point of contact between the rollers. When the marking pin is at the point of contact between the rollers, the portion of the tape that is also at the point of contact between the rollers is the same portion that was opposite the transducer gap when the trigger was depressed. Thus, when the marking pin is rotated past the point of contact, a small punch mark or hole is made in the tape by the point of the pin 12 at the exact spot where cutting is desired.

It should now be apparent that there has been provided a simple, effective device for marking tapes bearing invisible records to facilitate the editing thereof.

What is claimed is:

1. A tape marking device comprising, in combination, a base member, a first roller mounted on said base member, a second roller mounted adjacent to said first roller, said second roller being movable from a closed position in contact with said first roller to an open position out of contact with said first roller, marking means comprising a marking pin substantially imbedded in and radially disposed with respect to said first roller, and positioning means associated with said first roller for normally positioning said first roller so that said marking pin is disposed a predetermined circumferential distance about said first roller from the point of contact between said rollers.

2. A tape marking device comprising, in combination, a base member, a first roller mounted on said base member, a second roller mounted adjacent to said first roller, said second roller being movable from a closed position in contact with said first roller to an open position out of contact with said first roller, marking means comprising a marking pin substantially imbedded in and radially disposed with respect to said first roller, and positioning means associated with said first roller for normally positioning said first roller so that said marking pin is disposed a predetermined circumferential distance about said first roller from the point of contact between said rollers, said positioning means comprising a stop member secured to said first roller, a limiting member secured to said base member and biasing means normally holding said stop member against said limiting member.

3. The invention as set forth in claim 2 wherein said rollers are resilient.

4. The invention as set forth in claim 2 characterized by the addition of spring means for normally biasing said second roller into its closed position, and latch means adapted to hold said second roller in said open position.

5. The invention as set forth in claim 2 wherein said positioning means is adjustable whereby the normal position of said marking means may be varied.

6. The invention as set forth in claim 4 characterized by the addition of spring means associated with said latch means to cause said latch to become engaged upon the movement of said second roller to its open position, and trigger means for disengaging said latch.

7. In a magnetic-record tape editing machine, the combination with a magnetic signal reproducing transducer having a nonmagnetic gap of a tape marking device comprising a first roller, a second roller mounted adjacent to said first roller, said second roller being movable from a closed position in contact with said first roller to an open position out of contact with said first roller, a marking pin substantially imbedded in and radially disposed with respect to said first roller, and positioning means associated with said first roller whereby said marking pin is normally disposed at a predetermined circumferential distance about said first roller from the point of contact between said rollers substantially equal to the distance from said point of contact to said gap in said transducer, the tape to be marked being insertable between said rollers while engaging said transducer.

8. The invention as set forth in claim 7 wherein said positioning means comprises a stop member secured to said first roller, a limiting member secured adjacent to said first roller, and biasing means normally holding said stop member against said limiting member.

9. In a magnetic-record tape editing machine, the combination with a magnetic signal reproducing transducer having a nonmagnetic gap of a tape marking device comprising a first roller, a second roller mounted adjacent to said first roller, said second roller being movable from a closed position in contact with said first roller to an open position out of contact with said first roller, spring means normally biasing said second roller into said closed position, latch means adapted to hold said second roller in said open position, a marking pin substantially imbedded in and radially disposed with respect to said first roller, and positioning means associated with said first roller whereby said marking pin is normally disposed at a predetermined circumferential distance about said first roller from the point of contact between said rollers substantially equal to the distance from said point of contact to said gap in said transducer, the tape to be marked being insertable between said rollers while simultaneously engaging said transducer.

10. In a magnetic-record tape editing machine, the combination with a magnetic signal reproducing transducer having a nonmagnetic gap with a tape marking device comprising a first roller, a second roller mounted adjacent to said first roller, said second roller being movable from a closed position in contact with said first roller to an open position out of contact with said first roller, spring means normally biasing said second roller into said closed position, latch means adapted to hold said second roller in said open position, spring means associated with said latch means to cause said latch to become engaged upon the movement of said roller to its open position, trigger means for disengaging said latch, a marking pin substantially imbedded in and radially disposed with respect to said first roller, and positioning means associated with said first roller whereby said marking pin is normally disposed at a predetermined circumferential distance about said first roller from the point of contact between said rollers substantially equal to the distance from said point of contact to said gap in said transducer.

MILTON H. HUTT.

References Cited in the file of this patent

UNITED STATES PATENTS

| Number | Name | Date |
|---|---|---|
| 1,257,321 | Cumfer | Feb. 26, 1918 |
| 2,205,573 | Medwick | June 25, 1940 |
| 2,295,073 | Blythe | Sept. 8, 1942 |
| 2,419,682 | Guillemin | Apr. 29, 1947 |

FOREIGN PATENTS

| Number | Country | Date |
|---|---|---|
| 100,622 | Australia | Mar. 23, 1937 |
| 474,894 | Great Britain | Nov. 9, 1937 |